United States Patent
Inada

(10) Patent No.: US 7,593,583 B2
(45) Date of Patent: Sep. 22, 2009

(54) APPARATUS, METHOD AND PROGRAM FOR COMPRESSING INFORMATION

(75) Inventor: Yohichi Inada, Kanagawa-ken (JP)

(73) Assignee: Ricoh Company, Ltd., Tokyo (JP)

(*) Notice: Subject to any disclaimer, the term of this patent is extended or adjusted under 35 U.S.C. 154(b) by 853 days.

(21) Appl. No.: 10/723,203

(22) Filed: Nov. 26, 2003

(65) Prior Publication Data

US 2004/0175051 A1 Sep. 9, 2004

(30) Foreign Application Priority Data

Nov. 28, 2002 (JP) ............................. 2002-345104

(51) Int. Cl.
*G06K 9/36* (2006.01)
(52) U.S. Cl. ....................... 382/239; 382/232
(58) Field of Classification Search ........................ None
See application file for complete search history.

(56) References Cited

U.S. PATENT DOCUMENTS 5,046,121 A * 9/1991 Yonekawa et al. .......... 382/250
5,793,893 A * 8/1998 Kim ............................ 382/242
6,263,021 B1 * 7/2001 Sethuraman et al. ... 375/240.03
6,460,061 B1 * 10/2002 Dick ............................ 708/401
2003/0123740 A1 * 7/2003 Mukherjee .................. 382/239

FOREIGN PATENT DOCUMENTS

JP        2000125295        4/2000

* cited by examiner

*Primary Examiner*—Bhavesh M Mehta
*Assistant Examiner*—Sean Motsinger
(74) *Attorney, Agent, or Firm*—Cooper & Dunham, LLP

(57) ABSTRACT

An information compression apparatus which compresses information and uses a DCT frequency conversion algorithm includes a plurality of block registers, a correction level register, a first control mechanism, and a data correction mechanism. The plurality of block registers store block-based multi-bit quantized data converted from the information output from an quantization execution module. The correction level register presets a correction level indicating a degree of data correction. The first control mechanism controls so as to perform a scanning operation for scanning each block of the plurality of block registers and a search operation for searching a block having a valid coefficient. The data correction mechanism corrects data to modify the valid coefficient of the block searched by the first control mechanism to an invalid coefficient based on the correction level started in the correction level register.

33 Claims, 10 Drawing Sheets

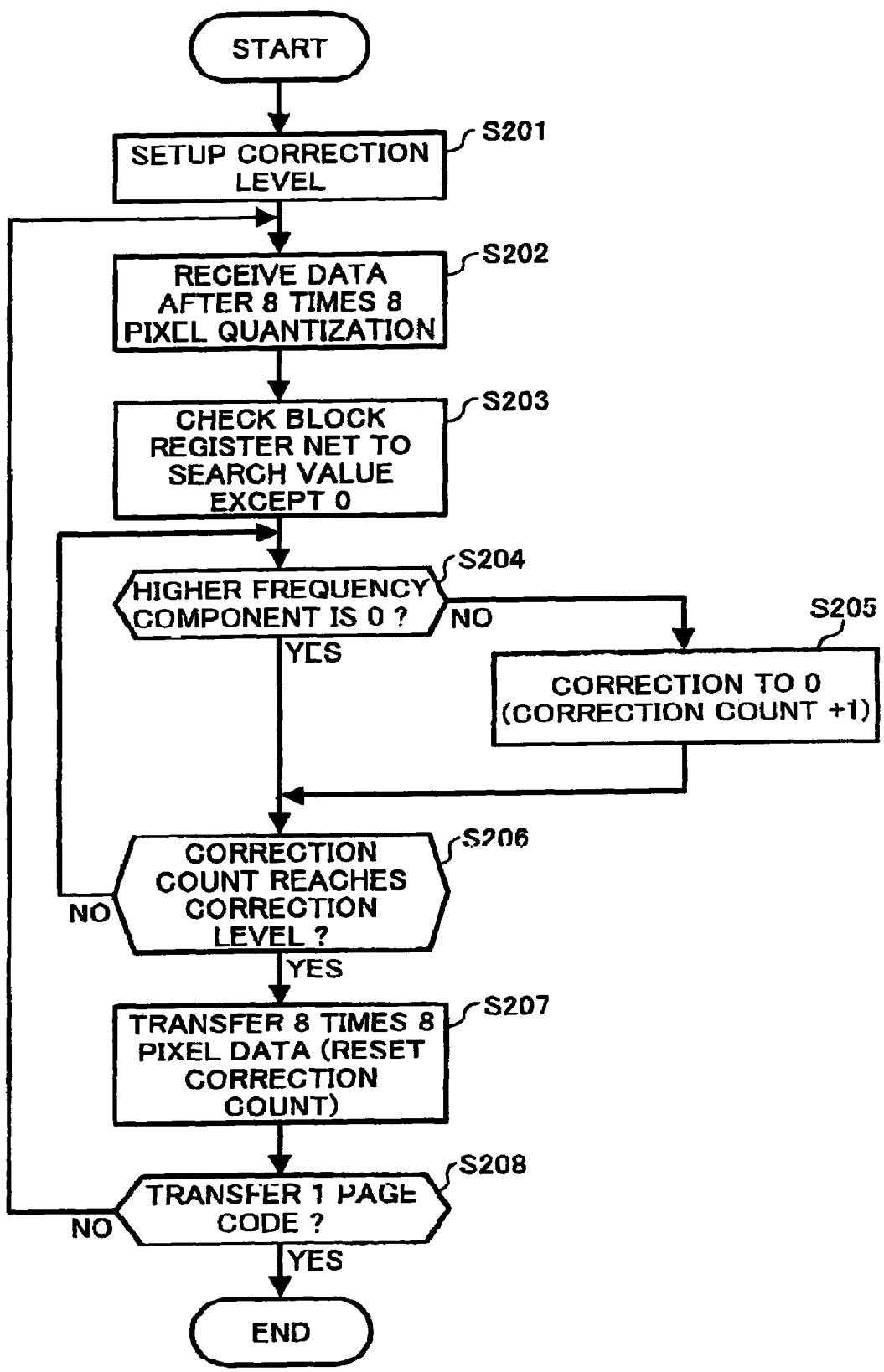

APPARATUS, METHOD AND PROGRAM FOR COMPRESSING INFORMATION

FIELD

This patent specification describes an apparatus, a method and a program for compressing information which include an image processing apparatus for use of DCT (Discrete Cosine Transform) frequency conversion algorithm or a sound compression processing apparatus for use of conversion algorithm such as an adaptive differential PCM (Pulse Code Modulation). More particularly, the patent specification describes an apparatus, a method and a program for compressing information applied to a digital copier, a printer, a digital camera, or an audio transceiver device, an intermediate equipment in a public communication network, and an intermediate equipment of satellite communication and the like.

BACKGROUND

Conventionally, transmission of image information and storage of the image information in a storage device require a steep communications charge and a large capacity storage. To efficiently transmit or store image information, various technologies are currently used for compressing images.

One such example is to reduce an amount of coding by using image features and to omit a portion of information. Another is an entropy coding which assigns a short code to a value which frequently occurs. Another is to reduce an amount of coding by increasing a statistical bias.

An image compression method includes an information conversion process and an entropy coding process to represent the image information with minimum codes, 1 and 0. In the information conversion process, as mentioned previously, a previous processing for matching image contents is performed by reducing the amount of coding, omitting a portion of information, modifying images to features rather than pixels, and converting image features so as to increase a statistical bias. In the entropy coding, a short code is assigned to a value which frequently occurs.

Additionally, sound compression also possesses problems in that sound is susceptible to noise and distortion during transmission. This causes these inaccuracy information to be stored in a recording medium. To efficiently transmit or store sound information, various technologies are currently used for compressing sound. One such example is to covert analog signals into digital signals to reduce noise, distortion, and degradation of information during transmission. However, bit rates may well be limited to 9.6 k bits/second based on current modem technology. Since the above-described techniques take 60 k bits/second to transmit the signals, the resultant signals cannot be transmitted via a communication line. Therefore, the sound signal compression (i.e., low bit coding) is required to transmit information.

As distribution of a signal amplitude is uniform, a given bit is effectively used and much information can be transmitted. According to this theory, the distribution of the signal amplitude is made as uniform as possible before it is coded. As a result, much information can be transmitted with less bits.

From this theory, a non-linear (logarithmic) companding PCM and a differential PCM and the like are further improved to develop an ADPCM (Adaptive Differential PCM).

In an image compression apparatus, a discrete cosine transform (DCT) is performed on an 8 times 8 pixel block to quantize the resultant value. In many cases, an alternating, or AC component are Huffman coded by scanning in a zigzag towards a high frequency from a low frequency (i.e., a zigzag scan). The Huffman codes are of variable length so that the codes are variable based on a likelihood of occurrence.

In addition, there is a trade off between a code amount and an original image. In general, increasing the size of a quantization table for less codes significantly degrades image quality. On the other hand, decreasing the size of the quantization table for less image degradation usually increases the code amount.

FIG. 1 is a drawing illustrating an example of a quantized 8 times 8 block register in a DCT coefficient algorithm. Labels r00, r01, r02, . . . r76, r77 are applied in FIG. 1 to reference elements of the 8 times 8 block register in FIG. 1. Such labels are not shown in, but also apply to corresponding elements in, the 8 times 8 block registers of FIGS. 5-7.

Zigzag arrows show a sequence of zigzag scanning at the time of Huffman coding. In the example of FIG. 1, pixel r00 represents a directing, or DC component which shows intensities (i.e., brightness) of 8 times 8 blocks. The other components are AC components represented by a slope from a low-frequency component to a high-frequency component as indicated by a translucent arrow.

After quantization, the coefficient is not likely to exist in the high frequency component. If any, the coefficient has little influence on images.

However, the Huffman coding is run length-dependent, but it is not affected by frequencies. If the high-frequency component has a isolated coefficient, an amount of coding is increased.

Japanese Laid-Open Patent Application Publication, No. 2000-125295, entitled "MOVING PICTURE CODER, ITS METHOD, MOVING PICTURE DECODER, ITS METHOD AND STORAGE MEDIUM" describes a method for reducing the quantity of transmission data while optimizing Huffman codes.

According to the above-mentioned specification, an optimum Huffman code is designed from quantized DCT transform coefficient data. An existing Huffman code is compared with the newly designed Huffman code to discriminate the necessity of a change of the Huffman code. When the new Huffman code is selected, a Huffman code table of the new Huffman code is stored in a table buffer, the new Huffman code table is added to the head of a JPEG file, and Huffman coding is applied to quantized DCT transform coefficient data and the result is added to the JPEG file. when the Huffman coding is applied to the data by using the existing Huffman code table, the Huffman code table does not need to be added to each frame.

Thus, the existing Huffman code table includes redundant information, which causes a decrease in coding efficiency. The new Huffman code table is optimally designed depending on a statistical nature of each frame. In the method of the above-mentioned specification, the difference between the existing Huffman code and the newly designed Huffman code is determined. If the resultant difference is less than a predetermined threshold value, the existing Huffman code table is utilized. If the difference is greater than the predetermined threshold value, the newly designed Huffman code table is utilized.

As described previously, in the image compression apparatus, there is a trade off between a code amount and an original image. In general, increasing the size of a quantization table for less codes significantly degrades image quality. On the other hand, decreasing the size of the quantization table for less image degradation usually increases the code amount.

To reduce the code amount while maintaining fidelity with an original image, an optimum quantized table needs to be selected from image types to be coded, as described in the above-mentioned specification. All existing techniques, however, possess their own distinct disadvantages. In a digital copier and a printer application, the optimum quantized table is downloaded for each image, which causes a decrease in system performance from a viewpoint of a processing speed.

Moreover, when the image types are not predicable, the quantized table is often predetermined in accordance with degree of image compression. As a result, an output code is not always the optimum code.

For sound compression, the same problems as the image compression occurs. There is a trade off between a code amount and an sound amount. Since the distribution of the signal amplitude is made as uniform as possible before it is coded, much information can be transmitted with less bits. However, when too few bits are transmitted, fidelity of sound is decreased.

SUMMARY

In one embodiment, a novel information compression apparatus which compresses information and uses a DCT frequency conversion algorithm includes a plurality of block registers, a correction level register, a first control mechanism, and a data correction mechanism. The plurality of block registers store block-based multi-bit quantized data converted from the information output from an quantization execution module. The correction level register presets a correction level indicating a degree of data correction. The first control mechanism controls so as to perform a scanning operation for scanning each block of the plurality of block registers and a search operation for searching a block having a valid coefficient. The data correction mechanism corrects data to modify the valid coefficient of the block searched by the first control mechanism to an invalid coefficient based on the correction level started in the correction level register.

The valid coefficient may be a coefficient having any coding amount except 0.

The scanning operation may include an inverse zigzag operation.

The above-mentioned information compression apparatus may further include a second control device which receives multi-bit quantized data output from the quantized execution module before the multi-bit quantized data is transmitted to the plurality of block registers and causes the first control mechanism to start the search operation.

The data correction device may move addresses of an isolated valid coefficient searched instead of modifying the valid coefficient to the invalid coefficient when modifying the valid coefficient to the invalid coefficient based on the correction level causes the information deterioration to an extent exceeding a predetermined limit so that the isolated valid coefficients are consecutively arranged.

The above-mentioned information compression apparatus may further include a block register net. The block register net may include a plurality of logical OR circuits corresponding to a plurality of frequencies used by the DCT frequency conversion algorithm such that each of the plurality of logical OR circuits outputs 1 when any one of the block registers connected thereto has a valid coefficient, and wherein the first control mechanism cancels its scanning operation.

A number of the plurality of logical OR circuits may be equal to a number of the plurality of frequencies.

When a quantization table for quantizing the plurality of block coefficients stored in registers is relatively large, the plurality of logical OR circuits for a high frequency side may be connected to each other.

The apparatus may use a Huffman coding method. The apparatus may use a JPEG coding method. The apparatus may use a sound data coding method.

Further, in one embodiment, a novel information compression method for compressing information and using a DCT frequency conversion algorithm includes the steps of presetting, latching, performing, modifying, counting, modifying, incrementing, continuously performing, and transferring. The presetting step presets a predetermined correction level indicating a degree of data correction. The latching step latches quantized data including valid coefficients and invalid coefficients into a block register. The performing step performs an inverse zigzag scan for scanning the block register to search a valid coefficient. The modifying step modifies an initially searched valid coefficient to an invalid coefficient. The counting step counts a number of searched valid coefficients. The modifying step modifies a subsequent searched valid coefficient to the invalid coefficient. The incrementing step increments the number of valid coefficients by one. The continuously performing step performs the inverse zigzag scan when the number of searched coefficients counted in the counting step is smaller than the collection level in the presetting step. The transferring step transforms the data of the block register to a coding module when the correction counter value reaches the correction level.

When a valid coefficient is modified to an invalid coefficient in the modifying steps, valid coefficients smaller than a predetermined threshold value may be deleted.

The above-mentioned program of an information compression may further include a presearching step for searching quantized data output from the quantization execution module before the search step.

The above-mentioned program of an information compression may further include an address moving step for moving addresses of isolated valid coefficients searched such that the isolated valid coefficients are consecutively arranged when the information deterioration to an extent exceeds a predetermined limit in the modifying steps, and wherein the modifying the steps are canceled instead.

The above-mentioned program of an information compression may further include a calculating step and a start address changing step. The calculating step calculates a total sum of coefficients of block registers arranged along each scanning line corresponding to one of different frequencies used in the DCT frequency conversion algorithm. The start address changing step changes an address of the block register to start the inverse zigzag scan.

The above-mentioned information compression method may further include a summing up step for summing up a plurality of the total sums calculating by calculating step to execute code calculation at an appropriate part of the block register.

Further, in one embodiment, a novel program of an information compression causing a computer using a JPEG coding method to execute an information compression operation according to a method includes the steps of presetting, latching, performing, modifying, counting, modifying, incrementing, continuously performing, and transferring.

The presetting step presets a predetermined correction level indicating a degree of data correction. The latching step latches quantized data including valid coefficients and invalid coefficients into a block register. The performing step performs an inverse zigzag scan for scanning the block register to search a valid coefficient. The modifying step modifies an initially searched valid coefficient to an invalid coefficient. The counting step counts a number of searched valid coefficients. The modifying step modifies a subsequent searched valid coefficient to the invalid coefficient. The incrementing step increments the number of valid coefficients by one. The continuously performing step performs the inverse zigzag scan when the number of searched coefficients counted in the counting step is smaller than the collection level in the presetting step. The transferring step transfers the data of the block register to a coding module when the correction counter value reaches the correction level.

When a valid coefficient is modified to an invalid coefficient in the modifying steps, valid coefficients smaller than a predetermined threshold value may be deleted.

The above-mentioned program of an information compression may further include a presearching step for searching quantized data output from the quantization execution module before the search step.

The above-mentioned program of an information compression may further include an address moving step for moving addresses of isolated valid coefficients searched such that the isolated valid coefficients are consecutively arranged when the information deterioration to an extent exceeds a predetermined limit in the modifying steps, and wherein the modifying the steps are canceled instead.

The above-mentioned program of an information compression may further include a calculating step and a start address changing step. The calculating step calculates a total sum of coefficients of block registers arranged along each scanning line corresponding to one of different frequencies used in the DCT frequency conversion algorithm. The start address changing step changes an address of the block register to start the inverse zigzag scan.

The above-mentioned program of an information compression may further include a summing up step for summing up a plurality of the total sums calculating by calculating step to execute code calculation at an appropriate part of the block register.

Further, in one embodiment, a novel program of an information compression causing a computer using a JPEG coding method to execute an information compression operation according to a method includes the steps of presetting, latching, performing, modifying, counting, modifying, incrementing, continuously performing, and transferring. The presetting step presets a predetermined correction level indicating a degree of data correction. The latching step latches quantized data including valid coefficients and invalid coefficients into a block register. The performing step performs an inverse zigzag scan for scanning the block register to search a valid coefficient. The modifying step modifies an initially searched valid coefficient to an invalid coefficient. The counting step counts a number of searched valid coefficients. The modifying step modifies a subsequent searched valid coefficient to the invalid coefficient. The incrementing step increments the number of valid coefficients by one. The continuously performing step performs the inverse zigzag scan when the number of searched coefficients counted in the counting step is smaller than the collection level in the presetting step. The transferring step transforms the data of the block register to a coding module when the correction counter value reaches the correction level.

Further, in one embodiment, a novel program of an information compression causing a computer using a sound data coding method to execute an information compression operation according to a method includes the steps of presetting, latching, performing, modifying, counting, modifying, incrementing, continuously performing, and transferring. The presetting step presets a predetermined correction level indicating a degree of data correction. The latching step latches quantized data including valid coefficients and invalid coefficients into a block register. The performing step performs an inverse zigzag scan for scanning the block register to search a valid coefficient. The modifying step modifies an initially searched valid coefficient to an invalid coefficient. The counting step counts a number of searched valid coefficients. The modifying step modifies a subsequent searched valid coefficient to the invalid coefficient. The incrementing step increments the number of valid coefficients by one. The continuously performing step performs the inverse zigzag scan when the number of searched coefficients counted in the counting step is smaller than the collection level in the presetting step. The transferring step transforms the data of the block register to a coding module when the correction counter value reaches the correction level.

Further, in one embodiment, a novel computer-readable media storing a program of an information compression causing a computer to execute an information compression operation using a DCT frequency conversion algorithm according to a method includes the steps of presetting, latching, performing, modifying, counting, modifying, incrementing, continuously performing, and transferring. The presetting step presets a predetermined correction level indicating a degree of data correction. The latching step latches quantized data including valid coefficients and invalid coefficients into a block register. The performing step performs an inverse zigzag scan for scanning the block register to search a valid coefficient. The modifying step modifies an initially searched valid coefficient to an invalid coefficient. The counting step counts a number of searched valid coefficients. The modifying step modifies a subsequent searched valid coefficient to the invalid coefficient. The incrementing step increments the number of valid coefficients by one. The continuously performing step performs the inverse zigzag scan when the number of searched coefficients counted in the counting step is smaller than the collection level in the presetting step. The transferring step transforms the data of the block register to a coding module when the correction counter value reaches the correction level.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 is flowchart illustrating an embodiment of an information compression method for explaining an operation of FIG. 6 according to the present specification.

DETAILED DESCRIPTION OF PREFERRED EMBODIMENTS

Figure 1:
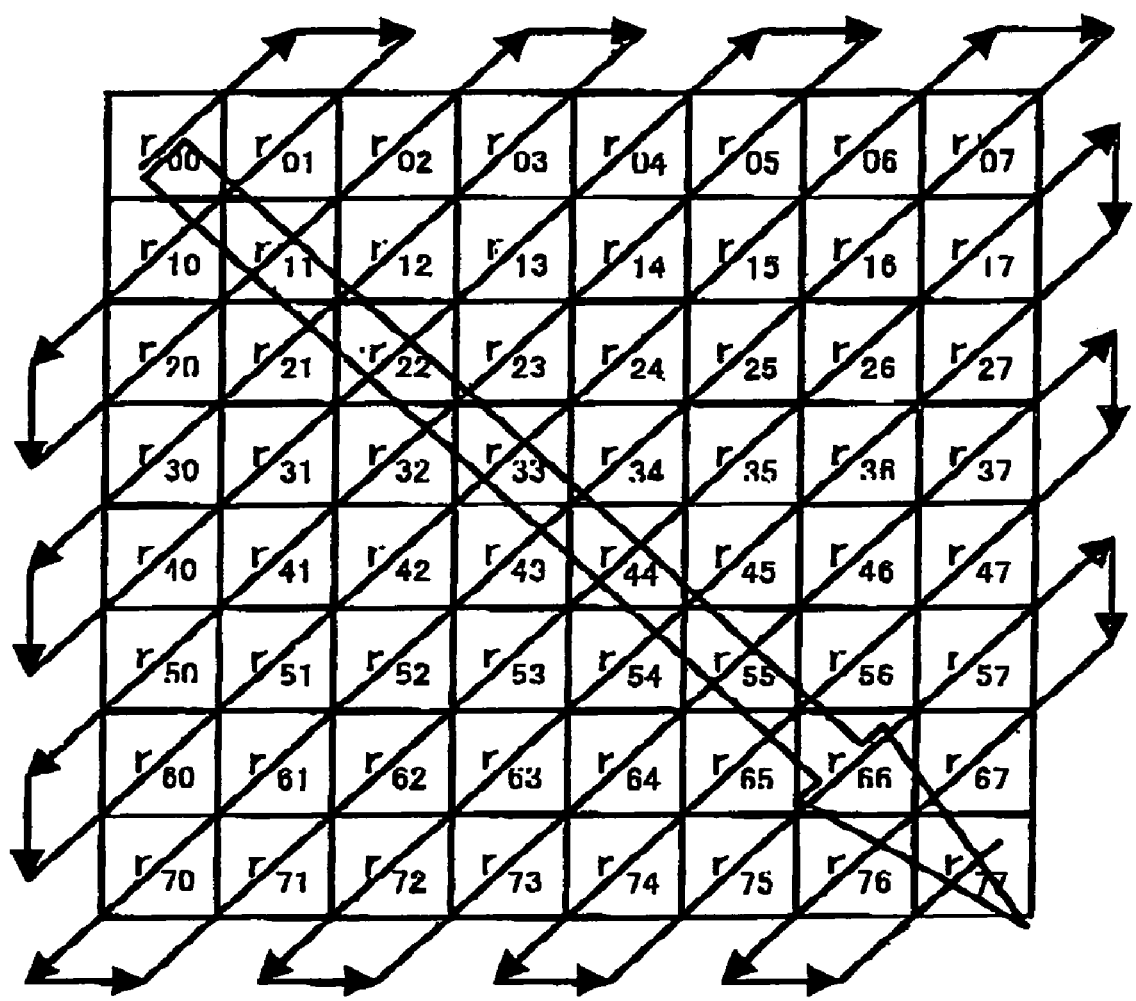
FIG. 1 is a drawing illustrating an example of a quantized 8 times 8 block register in a general DCT coefficient encoder.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, a DCT coefficient encoder block 20 according to a preferred embodiment of the present specification is explained.

Figure 2:
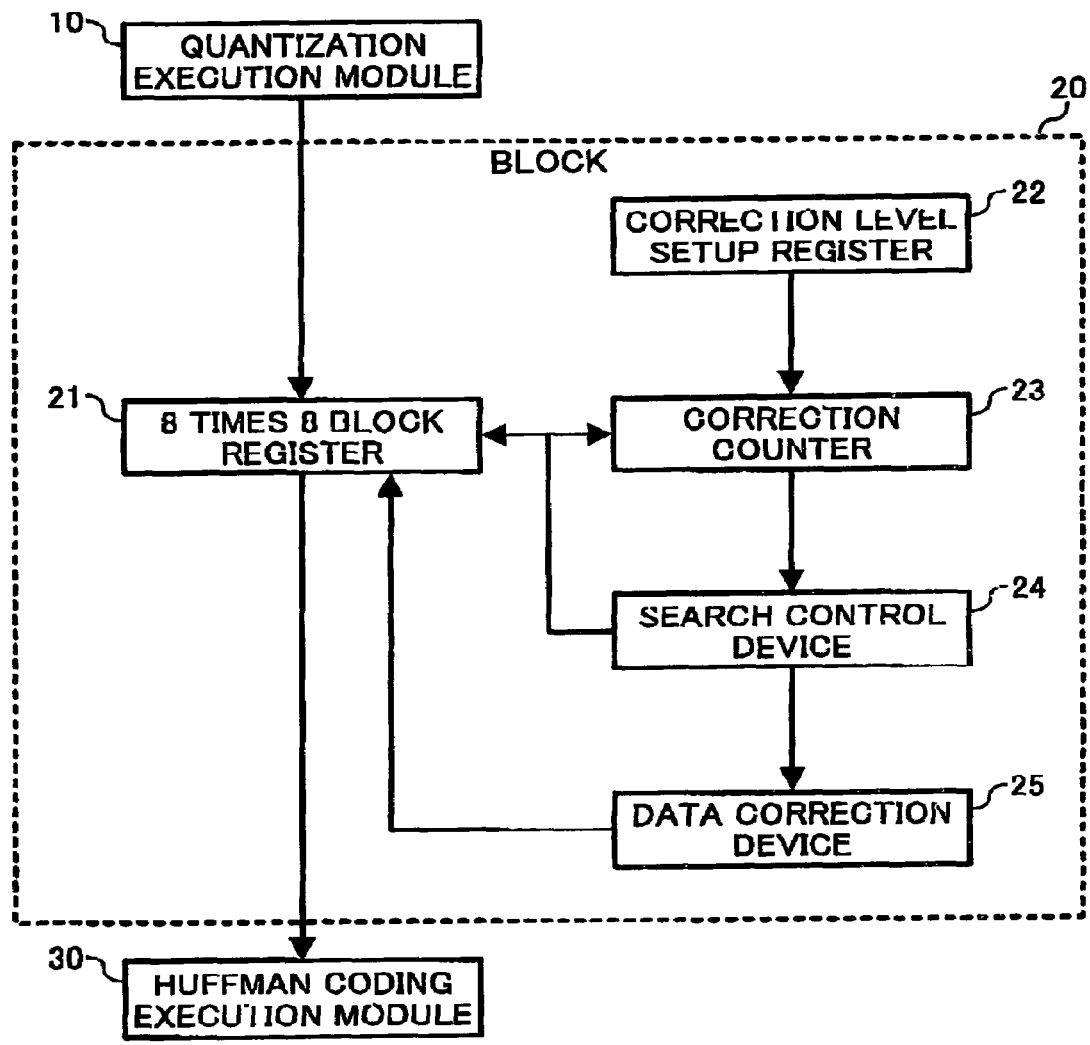
FIG. 2 is a block diagram illustrating an embodiment of an information compression apparatus according to the present specification.

As shown in FIG. 2, the DCT coefficient encoder block 20 is newly placed between a quantization execution module 10 of a first stage and a Huffman coding execution module 30 of a second stage. The DCT coefficient encoder block 20 includes a correction level setup register 22, a correction counter 23, an 8 times 8 pixel block register 21, a search control device 24, and a data correction device 25. The correction level setup register 22 sets up a level of correction. The correction counter 23 corrects the number of times of correction to be executed. The 8 times 8 pixel block register 21 stores data on an 8 times 8 pixel basis after a quantization. The search control device 24 searches data to be corrected. The data correction device 25 corrects searched data. Conventionally provided is the 8 times 8 pixel block register 21 which has a quantization table for showing an execution result of the quantization execution module 10.

Figure 4:
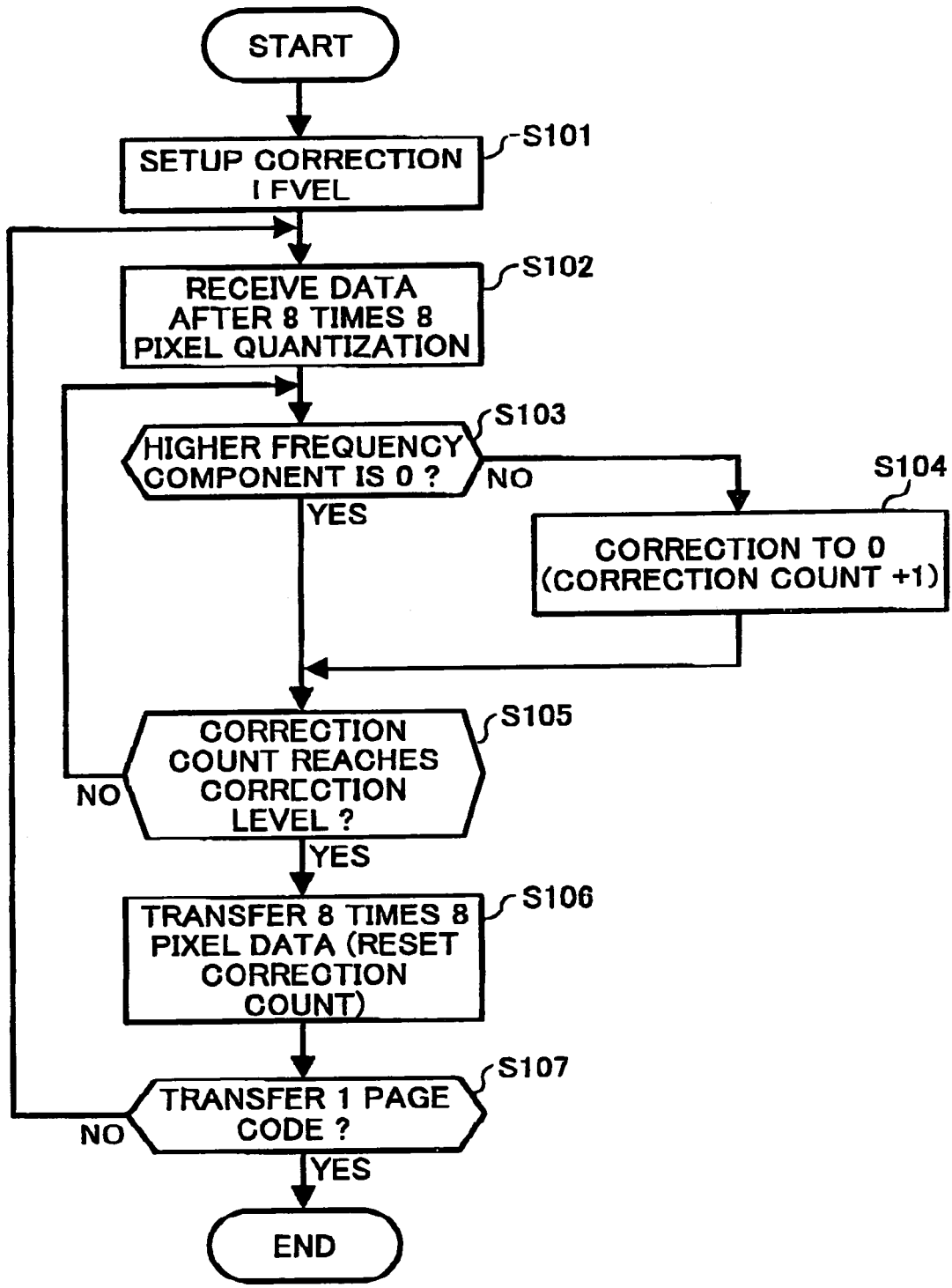
FIG. 4 is a flowchart illustrating an embodiment of an information compression method for explaining an operation of FIG. 2 according to the present specification.
Figure 5:
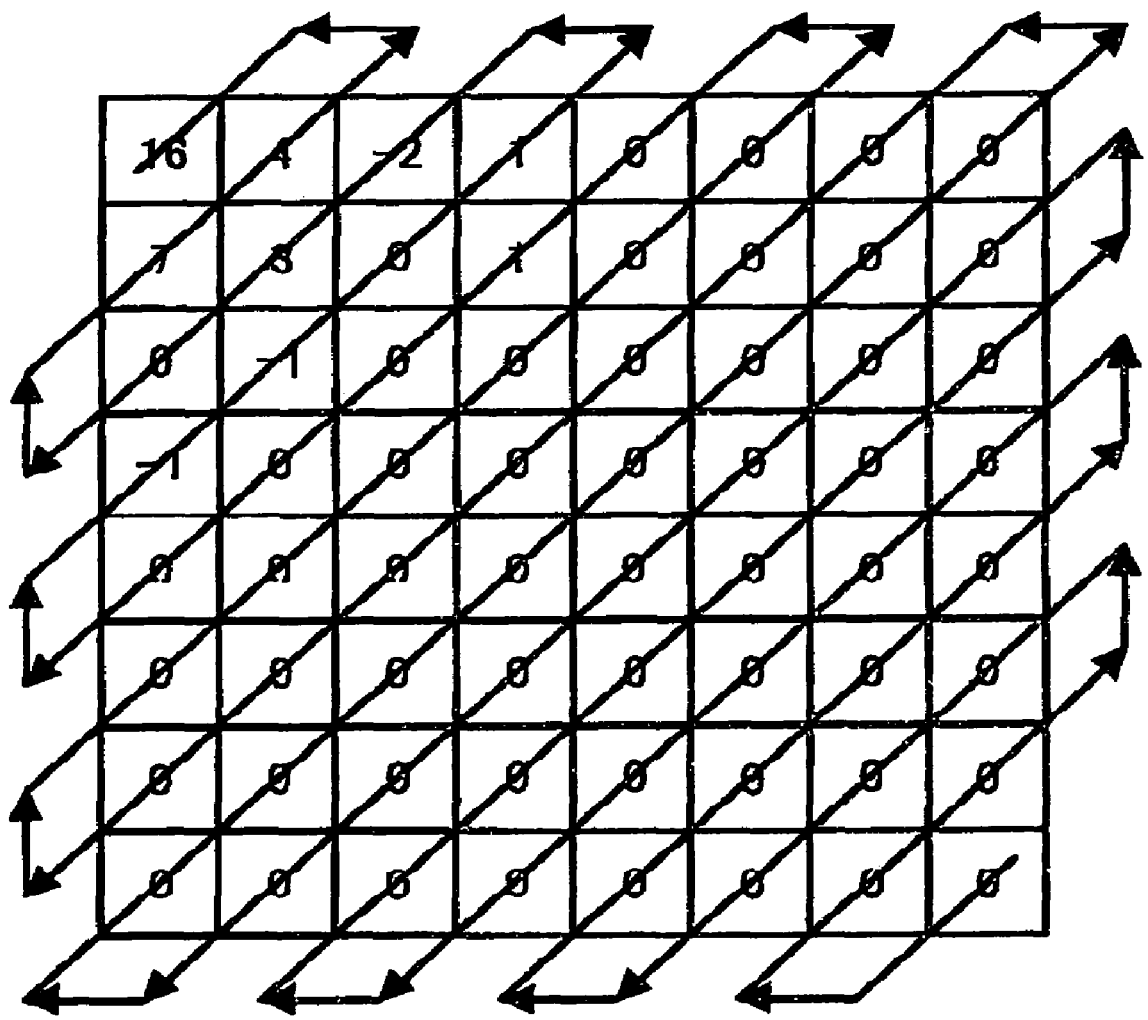
FIG. 5 is a drawing illustrating an inverse zigzag scan sequence of a quantized 8 times 8 block register for explaining an operation of FIG. 2 according to the present specification.

FIG. 4 is a flowchart illustrating an information compression method configured to obtain a decreased amount of coding in the DCT coefficient encoder block 20 in FIG. 2. FIG. 5 is a drawing illustrating an inverse zigzag scan operation, in the method of FIG. 4, on a quantized 8 times 8 pixel block register in FIG. 4.

As indicated in FIG. 4, a correction level is set in the correction level setup register 22 (Step 101). The correction level refers to a coefficient for indicating a degree of data correction for setting the number of times of data correction or a value or amount of coding. An increase in the correction level degrades image, but reduces the amount of coding to be generated.

The quantization execution module 10 then performs a DCT transformation and latches the quantized data into the 8 times 8 block register 21 (Step 102).

Referring now to FIG. 5, the 8 times 8 pixel block register 21 is inversely zigzag scanned to search for valid coefficients, in a conventional JPEG algorithm, Huffman coding is performed in accordance with a zigzag scan order (i.e., in a forward direction) shown in FIG. 1. As a result, as one exemplary valid coefficient r13 shown in FIG. 5 (see r13 of FIG. 1), a code length of Huffman coding is increased when a front and back blocks of the coefficient r13 are invalid (coefficients with 0 value).

The first valid coefficient (r13 with 1 value) found in the search in the inverse zigzag scan shown in the example of FIG. 5 is modified to 0 (Steps 103 and 104). At the same time, the correction counter 23 is counted up from 0 to 1 (Step 104).

When the correction counter 23 lacks a correction level or the number of coefficients to be modified is greater than one or such number exceeds a predetermined value even if one coefficient is modified from 1 to 0 (Step 105), the inverse zigzag scan continues and the next valid coefficient (r30 with 1 value) is modified to 0 (Steps 103 and 104).

In this step, when the correction counter 23 reaches the correction level (Step 105), it determines that the correction of the 8 times 8 pixel block register 21 has terminated to transfer data of the block register 21 to the Huffman coding execution module 30 (Step 106). At the same time, the value of the correction counter 23 is reset.

After the data transfer is completed, the quantization execution module 10 inputs a next 8 times 8 pixel block image into the 8 times 8 pixel block register 21. In Step 107, it is determined whether or not one page data is transferred. If the data is transferred, a process terminates. Otherwise, returning to Step 102, the 8 times 8 pixel block register 21 receives the next data block. This process is iterated until all data are input to the 8 times 8 pixel block register 21.

The above-mentioned flow may be applied to luminance or chroma components.

In Step 103, when a newly found valid coefficient 1 is located at a relatively low frequency or a coefficient itself has a large value, correction affects the image. To avoid these effects, a register which sets up minimum frequency or maximum valid coefficient for correction may be applied.

Figure 5A:
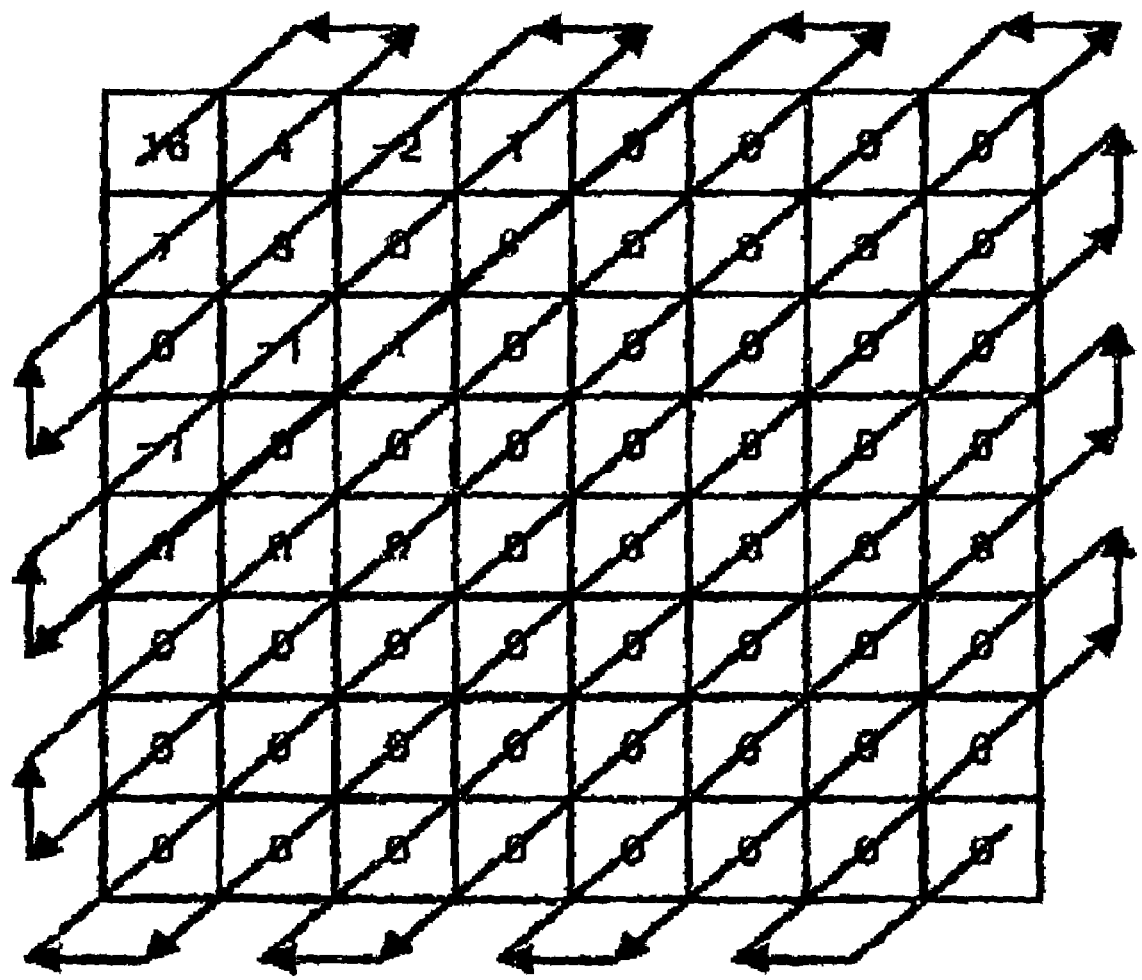
FIG. 5A is a drawing illustrating the 8 times 8 block register of FIG. 5 after the coefficient 1 of the r13 pixel has been changed to 0, and the r22 pixel has been modified to a coefficient 1.

When the image deterioration exceeds a limit even when the above-mentioned techniques is applied, an address of an isolated valid coefficient may be moved to line up other valid coefficients together without modifying the valid coefficient to the invalid coefficient. In the example of FIG. 5, the r13 pixel has a coefficient 1 which is modified to 0. At the same time in another example (FIG. 5A), the coefficient 1 can be moved from r13 to the r22 pixel located in front of r13 in the inverse zigzag scan.

As a result, since the valid coefficient is moved to some extent in a high frequency direction without modifying the valid coefficient to the invalid coefficient, the image deterioration is minimized.

This process also reduces a code generated by Huffman coding. In addition, when the valid coefficient is modified to the invalid coefficient in the modifying steps, valid coefficients smaller than a predetermined threshold value are deleted.

Figure 6:
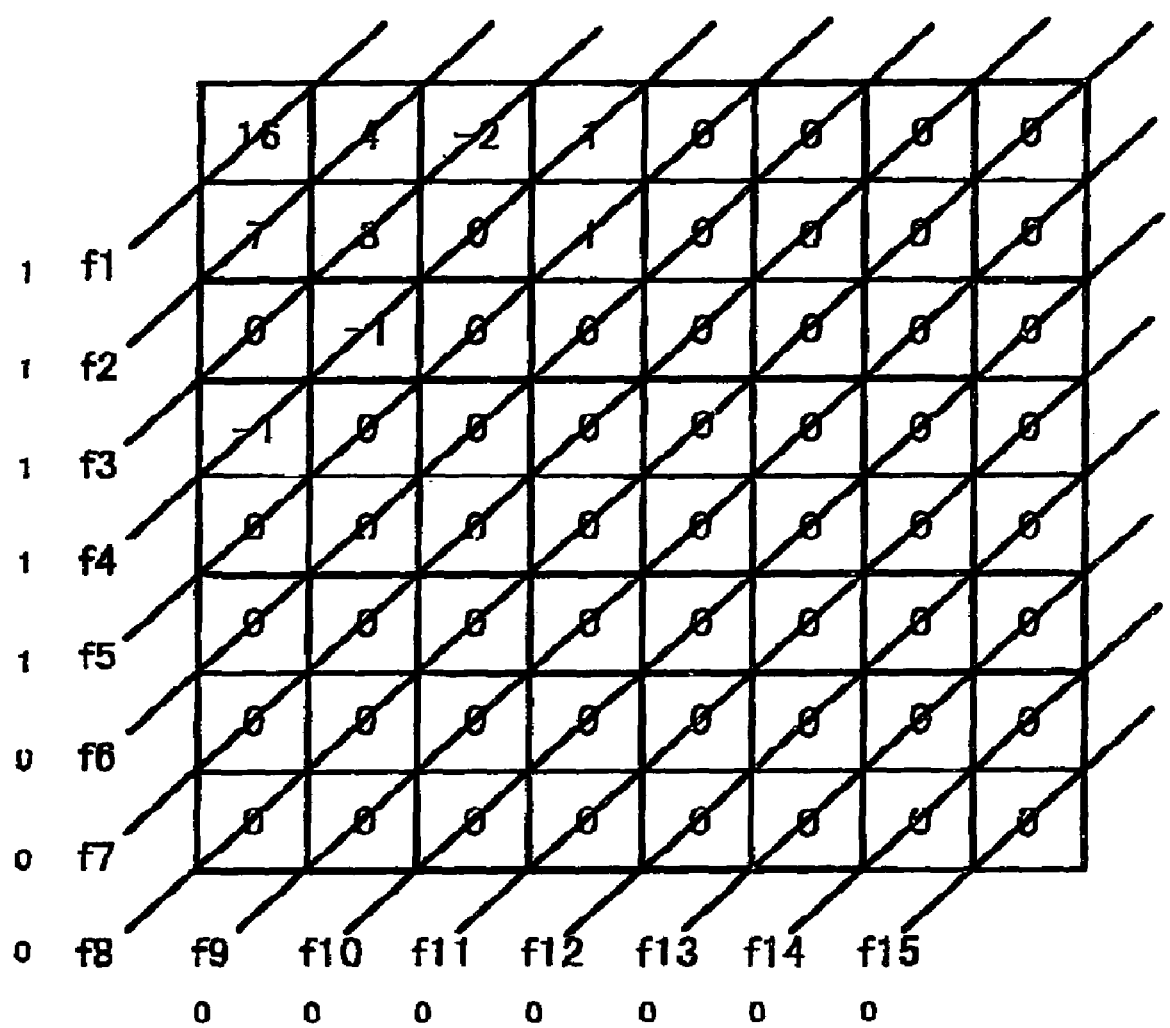
FIG. 6 is a drawing illustrating an embodiment of block register nets of an 8 times 8 block register according to the present specification.

FIG. 6 is a drawing illustrating an example of contents of the 8 times 8 pixel block register 21 according to another embodiment of the present specification. FIG. 8 is a flowchart for explaining an operation in the embodiment of FIG. 6.

In the above-mentioned embodiment shown in FIG. 2, when the 8 times 8 pixel block register 21 is inversely zigzag scanned, each register block is accessed so that a substantial amount of time is consumed. However, the embodiment improves this point for efficiency of the scan time.

The block register in the embodiment of FIG. 6 is provided with an OR circuit (i.e., block register nets f1 to f15) at the same time the coefficient is set to each block per scan lines or in accordance with each frequency (which is used by the DCT conversion) of a table after quantization.

The block register nets include OR circuits of all registers for each frequency (f1 to f15). The numbers to the left of the labels for f1 to f8 and the numbers below the labels for f9 to f15 represent results of OR circuits. Therefore, when one pixel or one bit is input, the value of the block register net is 1. In this process, 1 is set to the block register nets f1 to f15 immediately once data are input in all 64 blocks so that a correction address is immediately selected without the inverse zigzag scan.

In this embodiment, the structure of an information compression apparatus is the same as FIG. 2, except that the block register nets f1 to f15 are added to the 8 times 8 pixel block register 21.

Referring to FIG. 8, general operation of the information compression apparatus is illustrated.

The correction level is set in the correction level setup register 22 (Step 201). The quantization execution module 10 then performs a DCT transformation and latches the quantized data into the 8 times 8 block register 21 (Step 202). A search for valid coefficient in the block register nets included in the searched block register is performed (Step 203). The block register is checked to search for the block register net having a valid coefficient which is closest to high-frequency. In the example of FIG. 6, the block register net f5 is such a net (Step 204). The initially searched valid coefficient (r13 with 1 value) is corrected to the invalid coefficient (r13 with 0 value). At the same time, the correction counter 13 is counted up from 0 to 1 (Step 205).

When the correction counter 23 lacks a correction level (Step 206), the search device 24 continues to inversely search the next block register net (Step 204) and the data correction device 25 modifies the next valid coefficient (r03 in f4 with 1 value) to 0 (Step 205).

In this step, when the correction counter 23 reaches the correction level (Step 206), the correction of the 8 times 8 pixel block register 21 has terminated and data of the block register 21 is transferred to the Huffman coding execution module 30 (Step 207). At the same time, the value of the correction counter 23 is reset. After the data transfer is completed, the quantization execution module 10 inputs the next 8 times 8 pixel block image into the 8 times 8 pixel block register 21 (Step 202). If one page data is transferred (Step 208), the process terminates. This process is iterated until all data are input to the 8 times 8 pixel block register 21.

Figure 7:
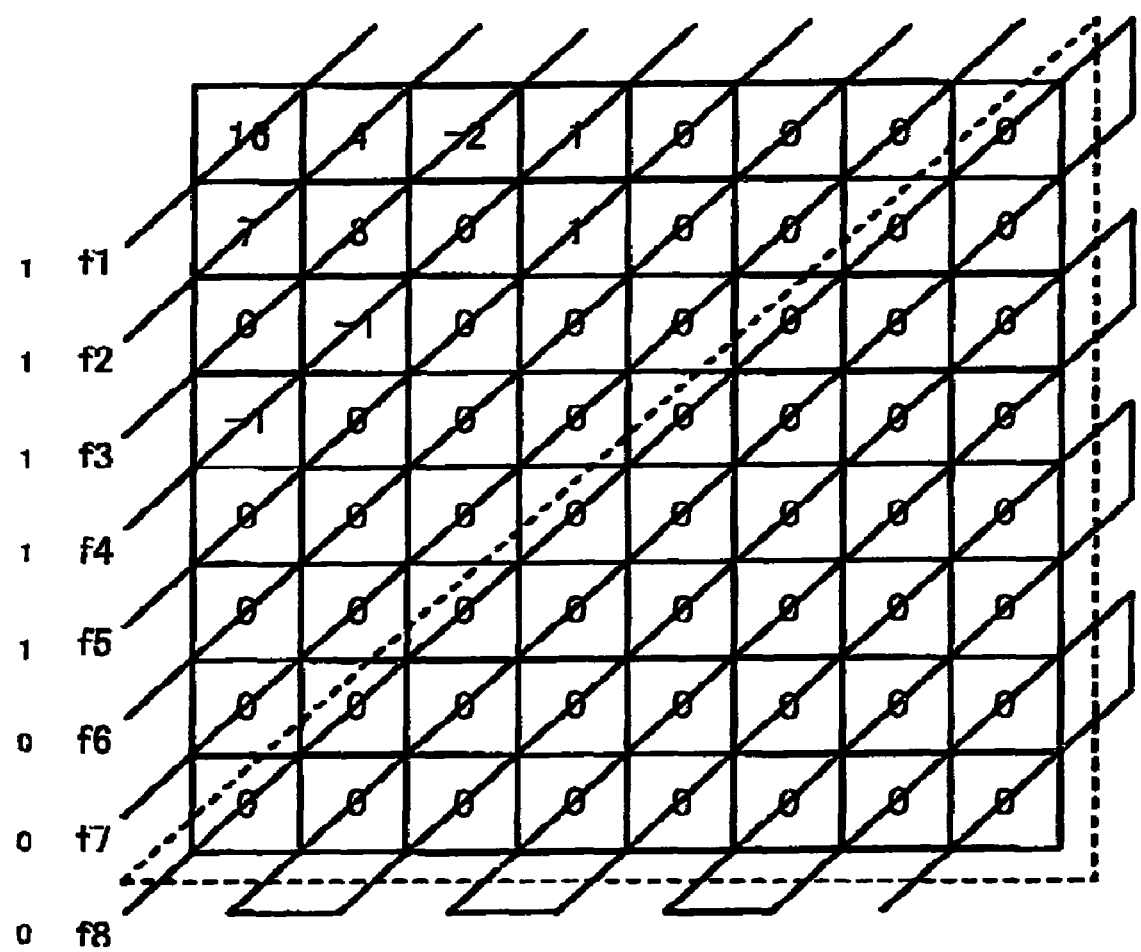
FIG. 7 is a drawing illustrating another embodiment of block register nets of an 8 times 8 block register according to the present specification.

FIG. 7 is a drawing illustrating an example of the 8 times 8 pixel block register 21 according to another embodiment of the present specification.

In the embodiment shown in FIG. 6, fifteen block register nets are used to split the 8 times 8 pixel block register 21. However, when fidelity to the original image of a desired image is known and a quantization table is used to locate the point where the valid coefficient exists, the above-mentioned split method is modified to efficiently reduce a generated code. For example, as shown in FIG. 7, when the quantization table is relatively large, a high-frequency component often includes the invalid coefficient so that it is beneficial to search the block register nets f9 to f15 shown in a dotted triangle as one block. Therefore, an operation flowchart is the same steps as FIG. 8. However, the time for checking the block register net of Step 203 to search the value except 0 is reduced.

Figure 3:
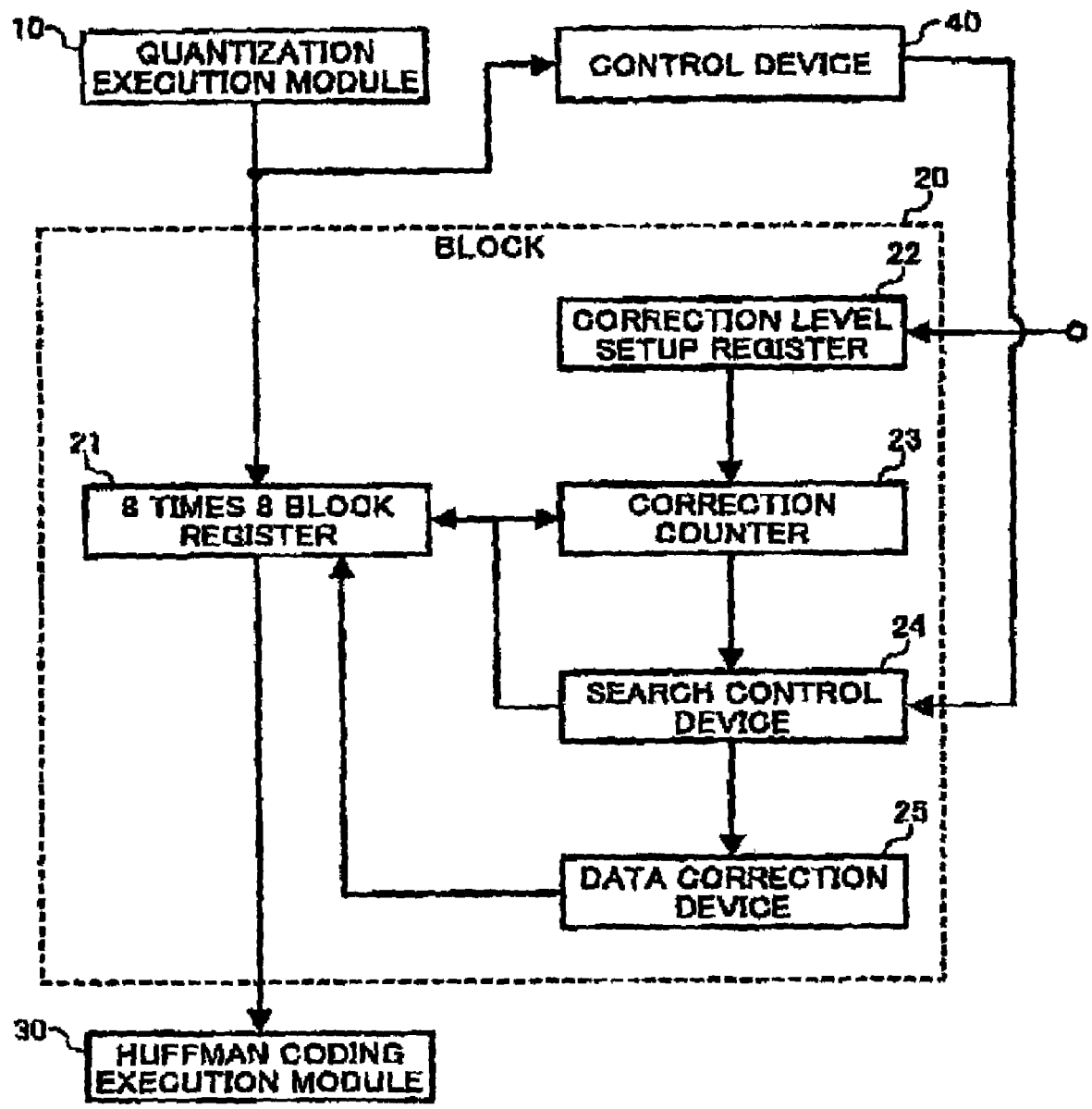
FIG. 3 is a block diagram illustrating another embodiment of an information compression apparatus according to the present specification.

FIG. 3 is a drawing illustrating an example of the information compression apparatus according to another embodiment of the present specification.

In the embodiments shown in FIGS. 2, 6 and 7, the quantization execution module 10 transfers data into the 8 times 8 block register 21 and the 8 times 8 block register 21 receives the data to set the coefficient to each block of the register 21.

Subsequently, the zigzag scan is performed or OR circuits are provided with all register blocks of the register 21 at each frequency to perform OR operations. The resulting data is displayed in the block register nets f1 to f15. Therefore, the 8 times 8 block register 21 receives the data and then the process stars so that it takes time to start the process. This embodiment solves the above-mentioned point.

As shown in FIG. 3, a control device 40 is connected at the output side of the quantization execution module 10. The quantization execution module 10 connects to the search register 24 of the DCT coefficient encoder block 20 for operating both devices together.

When the embodiment shown in FIG. 5 is applied to FIG. 2, the quantization execution module 10 performs the DCT transformation and outputs the quantized data into the 8 times 8 block register 21. At the same time, the search device 40 receives the data to transfer it to the search control device 24 which is prepared to inversely zigzag scan the block register to search for a valid coefficient.

The 8 times 8 block register 21 receives the data and latches the data into each block of the registers. At the same time, the search control device 24 performs the inverse zigzag scan to start searching for the valid coefficient with 1 value. Prior to this process, the correction level is required to be set to the correction level setup register 22. In addition, the valid coefficient address may be moved to other address.

When the embodiments shown in FIGS. 6 and 7 are applied to FIG. 3, the operation is the same steps FIG. 5. In other words, the quantization execution module 10 performs the DCT transformation and outputs the quantized data into the 8 times 8 block register 21. At the same time, the search device 40 receives the data and transfers it to the search control device 24. As a result, the search control device 24 is prepared to operate the block register nets f1 to f15. In addition, when the embodiment shown in FIG. 7 is applied to FIG. 3, only black register nets f1 to f8 need be configured to operate for further reducing process time.

Figure 6A:
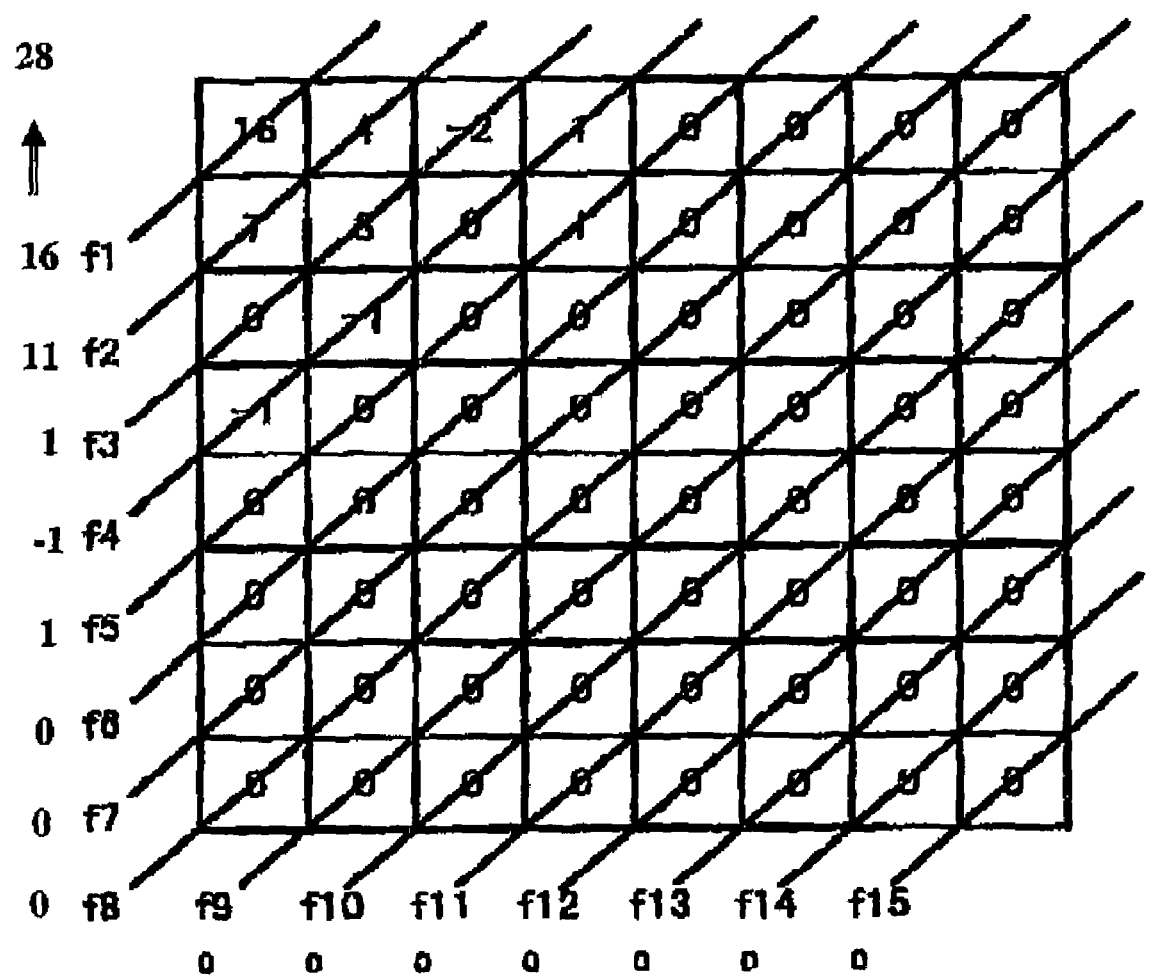

The block register 21 may include a calculating step for calculating a total sum of coefficients of block registers arranged along each scanning line corresponding to one of different frequencies used in the DCT frequency conversion algorithm (FIG. 6A), a summing up step for summing up a plurality of the total sums (FIG. 6A), and a start address changing step for changing an address of the block register to start the inverse zigzag scan.

According to another embodiment of the present specification, an example of a sound compression is described. The sound compression is also applied to the above-mentioned embodiments so that the 8 times 8 block register can be formed. Scanning images provide analog signals as image information. To faithfully represent this waveform as digital signals, a value of the longitudinal axis in the position of a plane needs to be numerically represented. Therefore, a quantized value of the vertical axis in each position is numerically represented.

On the other hand, in the case of a sound, air pressure generated by utterances vibrates an air in the vicinity. Since the air vibrates a tympanic member, the sound is audible. The vibration of the air (i.e., sound pressure) is converted into an electrical signal by a microphone so that an audio signal is provided. The audio signal is time varying. Therefore, a graph is represented as an analog waveform with time on the horizontal axis and vibration (i.e., sound pressure) on the vertical axis. Thus, the sound is compressed in the similar manner as the image, except that the horizontal axis represents a distance for the image and the horizontal axis represents time for the sound.

In a digital image compression, a brightness of the image is quantized into a discrete value and is provided as the brightness (i.e., a pixel value) per pixel. In the 8 times 8 block register 21 taking a pixel value per column, this pixel value is a numerical representation of the brightness of the image, where 0 represents black, 255 represents white, and others represent gray. The value is inversely discrete cosine transformed (DCT) to yield DCT coefficients. The coefficients represent a frequency component (i.e., amplitude) when the image represented by the digital signal is converted into the frequency component. In JPEG and MPEG, the DCT coefficient value instead of the pixel value is encoded.

In the sound compression, the digital signal is provided when the horizontal axis value of the analog waveform is sampled and the vertical axis value of the analog waveform is quantized. As distribution of a signal amplitude is uniform, much information can be transmitted so that the amplitude is encoded after making it as uniform as possible. From this principle, a compression method such as a non-linear (logarithmic) companding PCM and a differential PCM has been available. In recent years, another compression method, referred to as an Adaptive Differential PCM, has developed. The Adaptive Differential PCM controls (i.e., increases and decreases) a quantization interval based on the result of current encoding to compress information (i.e., reduce bits). The resulting code value is discrete cosine transformed (DCT) to provide the DCT coefficient. This coefficient represents a frequency component (i.e., amplitude) when the sound signal represented by the digital signal is converted into the frequency component.

Thus, in a time period, a frequency column is changed from the signal waveform of the above-mentioned sound signal compression method and takes a quantized value. Subsequently, the sanitized value is converted into a DCT coefficient value to form the 8 times 8 block register 21.

In this way, if the sound is applicable to the 8 times 8 block register 21, it is possible to integrate the structures shown in FIGS. 2 and 3 into a portion of the sound compression apparatus. Thus, similarly to the image compression, the sound compression is also applied to the embodiments shown in FIGS. 2, 3, 6 and 7.

The flowchart of the embodiment shown in FIG. 4 is designed to quantize the 8 times 8 pixel blocks and then transmit or receive data. However, in this embodiment, the above-mentioned flowchart is redesigned to quantize an 8 times 8 matrix for sound signals and then transmit or receive data. Subsequently, in FIG. 5, the zigzag scan is performed to search for the valid coefficient, followed by a modification of the coefficient from 1 to 0 and a replacement of the coefficient. As a result, the amount of coding is reduced without much affecting the sound. In addition, compression processing time is further reduced.

The sound compression is also applied to the embodiments shown in FIGS. 6 and 7. Accordingly, since the block register nets include OR circuits of all registers for each frequency, the inverse zigzag scan is not required to reflect the valid coefficient 1 in the block register nets. The block register nets effectively converts the valid coefficient into the invalid coefficient and replaces the coefficient.

In the embodiment shown in FIG. 3, the control device 40 immediately receives an output from the quantization execution module 10 and then the search control device 24 prepares for an operation, resulting in a reduction of processing time.

If the sound compression is represented with a sound pressure on the vertical axis, then the image compression is represented with an intensities on a Z axis to form an 8 times 8 times 8 register block. For the image compression, when the 8 times 8 register block 21 is Huffman coded, the zigzag scanning treats a two-dimension array as a one-dimension array. Therefore, it is possible to treat the sound and the image with the same way.

Further, when each step of the flowcharts shown in FIGS. 4 and 8 is transformed into an information compression program which is stored in a recording medium such as a CD-ROM, it is convenient to sell, buy, assign and transfer the program. In addition, the recording medium is inserted into a system computer for processing images or sounds for installation to realize the present specification readily.

This specification may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present specification may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. 2002-345104 filed on Nov. 28, 2002 in the Japanese Patent Office, the entire contents of which are incorporated by reference herein.

What is claimed as new and desired to be protected by Letters Patent of the United States is:

1. An information compression apparatus which compresses information and uses a DCT frequency conversion algorithm, comprising:

a plurality of block registers which store block-based multi-bit quantized data converted from information output from a quantization execution module;

a correction level register which presets a correction level indicating a number of data corrections and/or modifications;

a first control mechanism which controls operations of said apparatus so as to consider the plurality of block registers in a scan order and search each block, according to said scan order, for a valid coefficient; and a data correction mechanism configured to modify the valid coefficient, found in the search, to an invalid coefficient until a number of the valid coefficients modified to invalid coefficients reaches the correction level preset in the correction level register, wherein the said data correction mechanism moves an isolated valid coefficient that is at a first address not adjacent to another valid coefficient containing address, to a second address that is adjacent to said another valid coefficient containing address, when modifying the valid coefficient to the invalid coefficient based on the correction level causes information deterioration to an extent exceeding a predetermined limit.

2. The information compression apparatus as defined in claim 1, wherein the valid coefficient is a coefficient having any coding amount except zero.

3. The information compression apparatus as defined in claim 1, wherein said scan order in the operations includes an inverse zigzag operation.

4. The information compression apparatus as defined in claim 1, further comprising a second control device configured to receive the multi-bit quantized data output from the quantized execution module before the multi-bit quantized data is transmitted to the plurality of block registers, and after said second control device receives the multi-bit quantized data, cause the first control mechanism to start the search operation.

5. An information compression apparatus which compresses information and uses a DCT frequency conversion algorithm, comprising:
a plurality of block registers which store block-based multi-bit quantized data converted from information output from a quantization execution module;
a correction level register which presets a correction level indicating a number of data corrections and/or modifications;
a first control mechanism which controls operations of said apparatus so as to consider the plurality of block registers in a scan order and search each block, according to said scan order, for a valid coefficient; and
a data correction mechanism configured to modify the valid coefficient, found in the search, to an invalid coefficient until a number of the valid coefficients modified to invalid coefficients reaches the correction level preset in the correction level register; and
a block register net configured to perform a logical OR to the coefficients in the block registers connected thereto such that 1 is output when any one of the block registers connected thereto has a valid coefficient, and the first control mechanism cancels remaining operations to consider the block registers in the scan order.

6. The information compression apparatus as defined in claim 5, wherein said apparatus comprises a plurality of said block register nets and the number of block register nets is equal to the number of frequencies used by the DCT frequency conversion algorithm.

7. The information compression apparatus as defined in claim 6, wherein when a quantization table for quantizing the plurality of block coefficients stored in registers is relatively large, plural block register nets for a high frequency side are connected to each other and a logical OR is performed for the plural block register nets.

8. The information compression apparatus as defined in claim 1, wherein the apparatus uses a Huffman coding method.

9. The information compression apparatus as defined in claim 1, wherein the apparatus uses a JPEG coding method.

10. The information compression apparatus as defined in claim 1, wherein the apparatus uses a sound data coding method.

11. An information compression apparatus which compresses information and uses a DCT frequency conversion algorithm, comprising:
a plurality of block register means for storing block-based multi-bit quantized data converted from the information output from a quantization execution module means;
a correction level register means for presetting a correction level indicating a number of data corrections and/or modifications;
a first control means for controlling operations of said apparatus so as to consider the plurality of block register means in a scan order and search each block, according to said scan order, for a valid coefficient; and
a data correction means for modifying the valid coefficient, found in the search, to an invalid coefficient until a number of the valid coefficients modified to invalid coefficients reaches the correction level preset in the correction level register means,
wherein the data correction means moves an isolated valid coefficient that is at a first address not adjacent to another valid coefficient containing address, to a second address that is adjacent to said another valid coefficient containing address, when modifying the valid coefficient to the invalid coefficient based on the correction level causes information deterioration to an extent exceeding a predetermined limit.

12. The information compression apparatus as defined in claim 11, wherein the valid coefficient is a coefficient having any coding amount except 0.

13. The information compression apparatus as defined in claim 11, wherein said scan order in the operations includes an inverse zigzag operation.

14. The information compression apparatus as defined in claim 11, further comprising a second control means for receiving the multi-bit quantized data output from the quantized execution module means before the multi-bit quantized data is transmitted to the plurality of block register means, and after said second control device receives the multi-bit quantized data, causing the first control means to start the search operation.

15. An information compression apparatus which compresses information and uses a DCT frequency conversion algorithm, comprising:
a plurality of block register means for storing block-based multi-bit quantized data converted from the information output from a quantization execution module means;
a correction level register means for presetting a correction level indicating a number of data corrections and/or modifications;
a first control means for controlling operations of said apparatus so as to consider the plurality of block register means in a scan order and search each block, according to said scan order, for a valid coefficient;
a data correction means for modifying the valid coefficient, found in the search, to an invalid coefficient until a number of the valid coefficients modified to invalid coefficients reaches the correction level preset in the correction level register means; and
a block register net means for performing a logical OR to the coefficients in the block registers connected thereto such that 1 is output when any one of the block register means connected thereto has a valid coefficient, and wherein the first control means cancels remaining operations to consider the block registers in the scan order.

16. The information compression apparatus as defined in claim 15, wherein said apparatus comprises a plurality of said block register net means, and the number of block register net means is equal to the number of frequencies used by the DCT frequency conversion algorithm.

17. The information compression apparatus as defined in claim 15, wherein when a quantization table for quantizing the plurality of block coefficients stored in register means is relatively large, the plural block register net means for a high frequency side are connected to each other and a logical OR is performed for the plural block register net means.

18. The information compression apparatus as defined in claim 11, wherein the apparatus uses a Huffman coding method.

19. The information compression apparatus as defined in claim 11, wherein the apparatus uses a JPEG coding method.

20. The information compression apparatus as defined in claim 11, wherein the apparatus uses a sound data coding method.

21. An information compression method for compressing information and using a DCT frequency conversion algorithm, comprising the steps of:
(a) presetting a predetermined correction level indicating a number of data corrections and/or modifications;
(b) latching quantized data including valid coefficients and invalid coefficients into a block register;
(c) performing a search in an inverse zigzag scan order of said quantized data latched in said block register in step (b) to find one or more valid coefficients;
(d) modifying a valid coefficient found in step (c), to an invalid coefficient;
(e) counting a number of said valid coefficients modified to invalid coefficients in step (d);
(f) searching for and finding another valid coefficient, and modifying said another valid coefficient to the invalid coefficient;
(g) incrementing by one the number of valid coefficients modified to invalid coefficients counted in step (e);
(h) continuing the inverse zigzag scan to search for additional valid coefficients, when the number of valid coefficients modified to invalid coefficients is smaller than the correction level in step (a);
(i) transferring the data of the block register to a coding module when the number of valid coefficients modified to invalid coefficients reaches the correction level; and
an address moving step for moving addresses of isolated valid coefficients searched such that the isolated valid coefficients are arranged in corresponding adjacent addresses when the information deterioration exceeds a predetermined limit in steps (d) and (f), and wherein steps (d) and (f) are canceled instead.

22. The information compression method as defined in claim 21, wherein in steps (d) and (f), valid coefficients smaller than a predetermined threshold value are modified to an invalid coefficient.

23. The information compression method as defined in claim 21, further comprising a pre-searching step for searching the quantized data before step (c).

24. An information compression method for compressing information and using a DCT frequency conversion algorithm, comprising the steps of:
(a) presetting a predetermined correction level indicating a number of data corrections and/or modifications;
(b) latching quantized data including valid coefficients and invalid coefficients into a block register;
(c) performing a search in an inverse zigzag scan order of said quantized data latched in said block register in step (b) to find one or more valid coefficients;
(d) modifying a valid coefficient found in step (c) to an invalid coefficient;
(e) counting a number of said valid coefficients modified to invalid coefficients in step (d);
(f) searching for and finding another valid coefficient, and modifying said another valid coefficient to the invalid coefficient;
(g) incrementing by one the number of valid coefficients modified to invalid coefficients counted in step (e);
(h) continuing the inverse zigzag scan to search for additional valid coefficients, when the number of valid coefficients modified to invalid coefficients is smaller than the correction level in step (a);
(i) transferring the data of the block register to a coding module when the number of valid coefficients modified to invalid coefficients reaches the correction level; and
a calculating step for calculating a total sum of coefficients of block registers arranged along each scanning line corresponding to one of different frequencies used in the DCT frequency conversion algorithm.

25. The information compression method as defined in claim 24, further comprising a summing up step for summing up a plurality of the total sums calculated by said calculating step.

26. A computer-readable medium tangibly embodying a program causing a computer to execute an information compression operation using a DCT frequency conversion algorithm according to a method comprising the steps of:
(a) presetting a predetermined correction level indicating a number of data corrections and/or modifications;
(b) latching quantized data including valid coefficients and invalid coefficients into a block register;
(c) performing a search in an inverse zigzag scan order of said quantized data latched in said block register in step (b) to find one or more valid coefficients;
(d) modifying a valid coefficient found in step (c), to an invalid coefficient;
(e) counting a number of said valid coefficients modified to invalid coefficients in step (d);
(f) searching for and finding another valid coefficient, and modifying said another valid coefficient to the invalid coefficient;
(g) incrementing by one the number of valid coefficients modified to invalid coefficients counted in step (e);
(h) continuing the inverse zigzag scan to search for additional valid coefficients, when the number of valid coefficients modified to invalid coefficients is smaller than the correction level in step (a);
(i) transferring the data of the block register to a coding module when the number of valid coefficients modified to invalid coefficients reaches the correction level; and
an address moving step for moving addresses of isolated valid coefficients searched such that the isolated valid coefficients are arranged in corresponding adjacent addresses when the information deterioration to an extent exceeds a predetermined limit in the modifying steps, and wherein steps (d) and (f) are canceled instead.

27. The computer-readable medium tangibly embodying the program as defined in claim 26, wherein in steps (d) and (f), valid coefficients smaller than a predetermined threshold value are modified to an invalid coefficient.

28. The computer-readable medium tangibly embodying the program as defined in claim 26, further comprising a presearching step for searching the quantized data in step (e).

29. A computer-readable medium tangibly embodying a program causing a computer to execute an information compression operation using a DCT frequency conversion algorithm according to a method comprising the steps of:
(a) presetting a predetermined correction level indicating a number of data corrections and/or modifications;
(b) latching quantized data including valid coefficients and invalid coefficients into a block register;
(c) performing a search in an inverse zigzag scan order of said quantized data latched in said block register in step (b) to find one or more valid coefficients;
(d) modifying a valid coefficient found in step (c), to an invalid coefficient;
(e) counting a number of said valid coefficients modified to invalid coefficients in step (d);

(f) searching for and finding another valid coefficient, and modifying said another valid coefficient to the invalid coefficient;

(g) incrementing by one the number of valid coefficients modified to invalid coefficients counted in step (e);

(h) continuing the inverse zigzag scan to search for additional valid coefficients, when the number of valid coefficients modified to invalid coefficients is smaller than the correction level in step (a);

(i) transferring the data of the block register to a coding module when the number of valid coefficients modified to invalid coefficients reaches the correction level; and a calculating step for calculating a total sum of coefficients of block registers arranged along each scanning line corresponding to one of different frequencies used in the DCT frequency conversion algorithm.

30. The computer-readable medium tangibly embodying the program as defined in claim 29, further comprising a summing up step for summing up a plurality of the total sums calculated by said calculating step to execute code calculation at an appropriate part of the block register.

31. A computer-readable medium tangibly embodying a program causing a computer using a JPEG coding method to execute an information compression operation according to a method comprising the steps of:

(a) presetting a predetermined correction level indicating a number of data corrections and/or modifications;

(b) latching quantized data including valid coefficients and invalid coefficients into a block register;

(c) performing a search in an inverse zigzag scan order of said quantized data latched in said block register in step (b) to find one or more valid coefficients;

(d) modifying a valid coefficient found in step (c), to an invalid coefficient;

(e) counting a number of said valid coefficients modified to invalid coefficients in step (d);

(f) searching for and finding another valid coefficient, and modifying said another valid coefficient to the invalid coefficient;

(g) incrementing by one the number of valid coefficients modified to invalid coefficients counted in step (e);

(h) continuing the inverse zigzag scan to search for additional valid coefficients, when the number of valid coefficients modified to invalid coefficients is smaller than the correction level in step (a);

(i) transferring the data of the block register to a coding module when the number of valid coefficients modified to invalid coefficients reaches the correction level; and an address moving step for moving addresses of isolated valid coefficients searched such that the isolated valid coefficients are arranged in corresponding adjacent addresses when the information deterioration exceeds a predetermined limit in steps (d) and (f), and wherein steps (d) and (f) are canceled instead.

32. A computer-readable medium tangibly embodying a program of an information compression causing a computer using a sound data coding method to execute an information compression operation according to a method comprising the steps of:

(a) presetting a predetermined correction level indicating a number of data corrections and/or modifications;

(b) latching quantized data including valid coefficients and invalid coefficients into a block register;

(c) performing a search in an inverse zigzag scan order of said quantized data latched in said block register in step (b) to find one or more valid coefficients;

(d) modifying a valid coefficient found in step (c), to an invalid coefficient;

(e) counting a number of said valid coefficients modified to invalid coefficients in step (d);

(f) searching for and finding another valid coefficient, and modifying said another valid coefficient to the invalid coefficient;

(g) incrementing by one the number of valid coefficients modified to invalid coefficients counted in step (e);

(h) continuing the inverse zigzag scan to search for additional valid coefficients, when the number of valid coefficients modified to invalid coefficients is smaller than the correction level in step (a);

(i) transferring the data of the block register to a coding module when the number of valid coefficients modified to invalid coefficients reaches the correction level; and an address moving step for moving addresses of isolated valid coefficients searched such that the isolated valid coefficients are arranged in corresponding adjacent addresses when the information deterioration to an extent exceeds a predetermined limit in the modifying steps, and wherein steps (d) and (f) are canceled instead.

33. The information compression apparatus as defined in claim 1, wherein said correction level preset by said correction level register corresponds to a setting of a number of permitted data corrections, and valid coefficients in said quantized data stored in said plurality of block registers are modified to invalid coefficients until the number of modifications reaches the correction level preset in the correction level register.

* * * * *